United States Patent [19]

Schwaerzler

[11] 4,219,156
[45] Aug. 26, 1980

[54] TILTABLE THRUST NOZZLE

[75] Inventor: Hans Schwaerzler, Taufkirchen, Fed. Rep. of Germany

[73] Assignee: Messerschmitt-Boelkow-Blohm Gesellschaft mit beschraenkter Haftung, Munich, Fed. Rep. of Germany

[21] Appl. No.: 898,824

[22] Filed: Apr. 21, 1978

[30] Foreign Application Priority Data

Apr. 30, 1977 [DE] Fed. Rep. of Germany ....... 2719439

[51] Int. Cl.² .................. B64C 15/06; B64C 15/12
[52] U.S. Cl. ........................... 239/265.35; 239/265.41
[58] Field of Search ................. 239/265.19, 265.33, 239/265.37, 265.35, 265.39, 265.41; 60/228, 232

[56] References Cited

U.S. PATENT DOCUMENTS

| | | | |
|---|---|---|---|
| 2,693,078 | 11/1954 | Laucher | 239/265.39 |
| 2,846,844 | 8/1958 | O'Rourke | 239/265.35 X |
| 3,233,834 | 2/1966 | Cottrell et al. | 239/265.35 |
| 3,281,082 | 10/1966 | Kerry | 239/265.35 |
| 3,319,892 | 5/1967 | Zirin | 239/265.35 |

Primary Examiner—Andres Kashnikow
Attorney, Agent, or Firm—W. G. Fasse; D. F. Gould

[57] ABSTRACT

A thrust nozzle or rather its exit end is tiltable for adjusting or controlling the direction of the thrust vector. For this purpose an adjustable ring is movably secured around the exit end of the thrust nozzle. The exit end of the thrust nozzle has a center located on the longitudinal central axis of the nozzle. The adjustable ring also has a center about which it is rotatable. The rotational center of the adjustable ring is also located on the longitudinal central axis of the thrust nozzle. The center of the nozzle end is spaced upstream from the rotational center of the adjustable ring. The adjustable ring rides on the radially outer surface of the nozzle end by way of a slide ring and is adjustable in its position relative to the nozzle end by control rods four of which may be arranged around the circumference of the adjustable ring.

5 Claims, 1 Drawing Figure

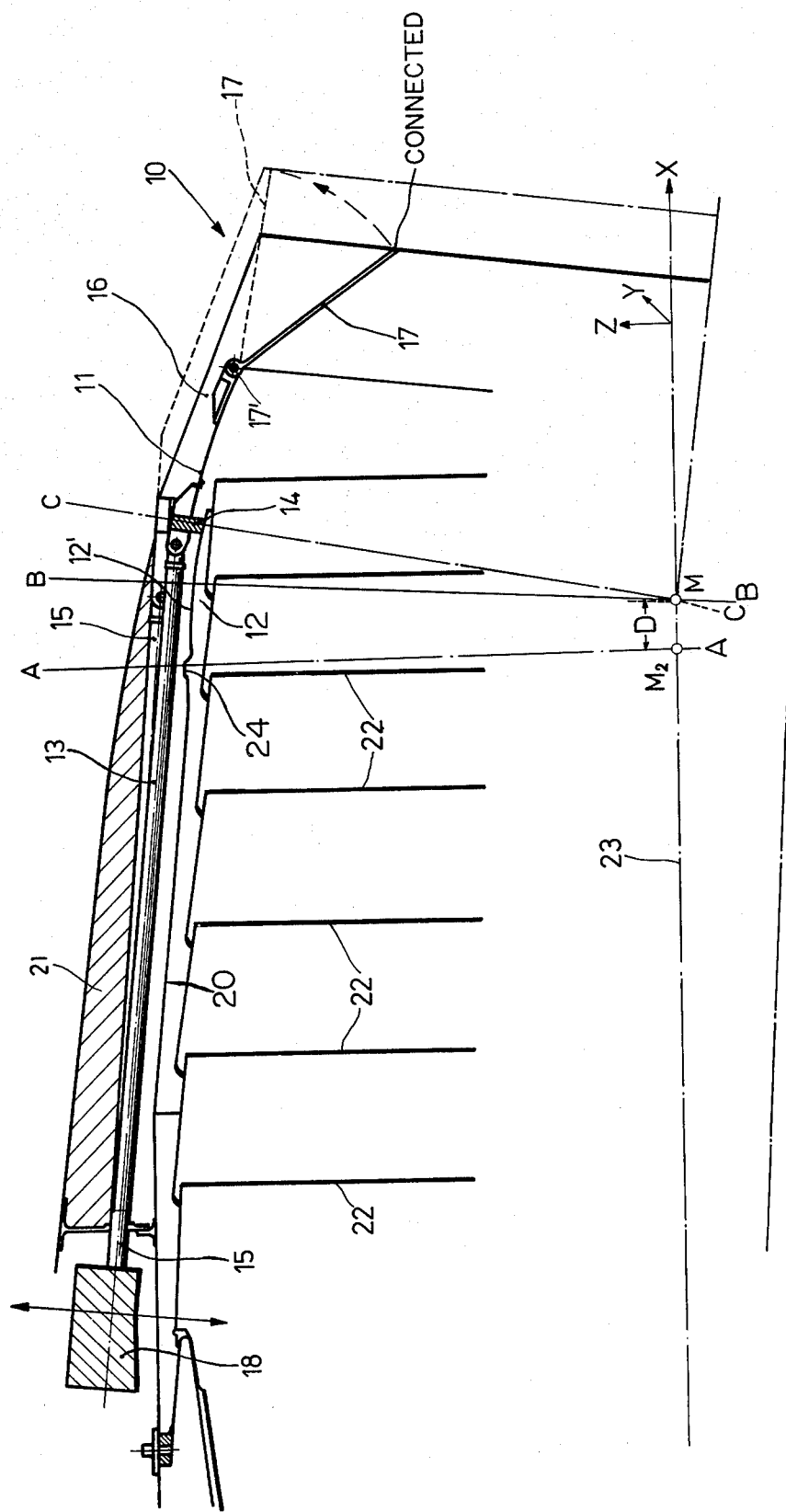

TILTABLE THRUST NOZZLE

BACKGROUND OF THE INVENTION

The present invention relates to a tiltable thrust nozzle. More specifically, the invention relates to controlling the direction of the thrust vector of a thrust nozzle which is provided with a nozzle end having a ball shaped or spherical configuration surrounded by a coaxially arranged displacable or adjustable ring means for adjusting the thrust vector.

Tiltable thrust nozzles are known in the art in numerous constructions all of which involve a rather expensive design. The complexity of prior art structures is even increased when they have a possibility for adjusting the thrust vector about the z-axis as well as about the y-axis. Thus, one prior art structure comprises pipe segments which are rotatable relative to each other. Another prior art structure comprises jet deflection members constructed as vanes which are tiltable into the nozzle exit. Still another prior art device comprises a nozzle mechanically supported by means of a universal joint. This nozzle is tiltable by means of suitable adjustment, gear drives such as a bevel gear drive co-operating with a universal joint shaft or with adjustment piston cylinder means.

The above described prior art devices are primarily suitable for the adjustment of relatively large thrust vector angles within the range of about 30° to 90°. Although it is possible to also adjust smaller thrust vector angles with such prior art devices, it becomes economically unfeasible to use such prior art devices for the adjustment of small angles, because of the required precise control. Prior art devices are not suitable for such precise adjustment unless the respective structure becomes economically unfeasible. Besides, the number of parts required in prior art devices for the adjustment of especially small thrust angles is rather large resulting in a respectively large weight. In this context reference is made to German Patent Publications DOS No. 1,964,716 and German Patent Publications DAS No. 1,199,624 and DAS No. 1,086,562.

German Patent Publication No. 1,964,716 discloses a tiltable thrust nozzle comprising a ring surrounding the jet pipe as well as a device for adjusting the cross sectional area of the nozzle or jet pipe. The adjusting device is supported by a ring from which the pipe wall segments are spaced all around. The ring is supported coaxially with the pipe and is displaceable and tiltable in all directions by means of three or more actuating members uniformly distributed about the rear edge of the ring. The pipe segments are tiltable about axes extending tangentially relative to the circumference of the ring. This prior art structure is also heavy as well as expensive since it requires a large number of individual parts. Besides, this type of structure causes substantial sealing problems relative to the gas jet. The avoidance of such sealing problems is rather expensive if it is desired to provide the best flow dynamic conditions for the gas jet.

OBJECTS OF THE INVENTION

In view of the foregoing, it is the aim of the invention to achieve the following objects singly or in combination:

to construct a thrust nozzle which will permit an adjustment of the thrust vector through a range of small angles between 0° and 10°;

to provide means for the adjustment of the thrust vector which adjustment is sufficient for the steering of an aircraft;

to design the adjustment components as simple as possible so as to provide an inexpensive steering of a craft such as an aircraft; and to construct the elements for the adjustment of the thrust vector in such a manner, that synchronization devices as well as translatory gear drives are unnecessary.

SUMMARY OF THE INVENTION

According to the invention there is provided an apparatus for the adjustment of the direction of the thrust vector of a thrust nozzle which is characterized in that the center of the spherical thrust nozzle end is axially displaced relative to the center of rotation of a ring member surrounding the thrust nozzle end, whereby the rotational center of the ring member is located downstream of the thrust nozzle end as viewed in the direction of the jet flow. A sliding ring element is arranged between the outer surface of the thrust nozzle end and the ring member for taking up cross forces effective in a direction extending perpendicularly to the longitudinal axis of the thrust nozzle. If said longitudinal axis of the thrust nozzle is considered to be the x-axis, such cross forces would be effective in the y-direction and in the z-direction.

The foregoing combination of features of the invention provides for guiding the gas jet in a flow dynamically advantageous manner. In addition, the invention avoids the need for swivel joints and it does not affect at all the inner lining of the thrust nozzle. The sealing of the tiltable nozzle relative to the thrust nozzle can be constructed very simply and any constrictions in the cross sectional flow area of the thrust nozzle have been avoided, even when the tilting angle is in its maximum adjusted position. In summary, the features of the invention permit a light and simple construction of the tiltable nozzle as well as a rapid and precise steering.

BRIEF FIGURE DESCRIPTION

In order that the invention may be clearly understood, it will now be described, with reference to the accompanying drawing, wherein the single FIGURE shows a sectional view through a thrust nozzle according to the invention and wherein only one half of the thrust nozzle is shown to accommodate the illustration to the size of the drawing sheet.

DETAILED DESCRIPTION OF PREFERRED EXAMPLE EMBODIMENTS

The thrust nozzle according to the invention has a tubular nozzle body 20 having an end member 12 with a predetermined or given surface configuration 12'. The nozzle body 20 merges into the end member 12 along a ring 24 defining a plane A—A. This surface configuration may, for example, form a ring portion of a sphere as shown or it may be cylindrical or conical. In the latter instance the cone would open to the left, when viewing the illustration. The nozzle body 20 is supported in a conventional housing 21 on the outside thereof. The inside of the nozzle body 20 is lined by conventional liners 22.

The components forming the nozzle structure proper have a longitudinal axis 23, which is a central rotational axis. The above mentioned x-direction coincides with the central axis 23. The y-direction and the z-direction extend perpendicularly to the central axis 23.

In order to adjust the thrust vector of the thrust nozzle through relatively small angles within the range of 0° to 10°, the invention provides a ring 11 for the nozzle 10, which is slidable in its position relative to the end member 12 of the nozzle body 20 in contact with the surface 12' of the end member 12. The adjustment ring 11 is shiftable about its center fo rotation "M" located on the central axis 23. A number of control rods 13 for operating or adjusting the position of the ring member 11 are secured at the left-hand end thereof to a conventional control mechanism 18 and at the right-hand end thereof to the ring member 11. The rods 13 hold the ring 11 substantially relative to forces effective in the x-direction. Three or four rods 13 may be distributed about the circumference of the thrust nozzle 10.

The ring 11 glides on the surface 12' by means of a slide ring 14. Thus, the ring 11 is also supported on the nozzle body end member 12 of the nozzle body 20. The slide ring 14 takes up forces effective in the y-direction and in the z-direction. The tilting adjustment of the ring 11 is accomplished through the control or operating rod 13 through spindles or piston cylinder arrangements 18 which as such are conventional.

The cross sectional area of the nozzle 10 is adjustable by a ring member 16 through control rods 15 which are also operatively connected to the control mechanism 18. The flow cross sectional area at the exit of the nozzle 10 is determined by the angular position of the nozzle flaps 17, one end of which is pivoted at 17' to the axially outer end of the ring 11. The other end of the nozzle flaps 17 is connected to the adjustment ring 16. Thus, depending on the axial position of the ring 16 axially out to the right or axially out to the left as viewed relative to the central axis 23, the position of the nozzle flaps 17 will determine the cross sectional size of the nozzle outflow area. According to the invention, the control or operating rods 13 for the angular position of the ring 11 and the control rods 15 for the axial position of the ring 16 are connected to the common control unit 18, which, as mentioned, may comprise spindles or piston cylinder means thereby obviating the need for synchronization devices and the heretofore required translatory gear drive means.

The conventional control unit 8 operates or drives the rods 13 and 15 in common when it is desired to tilt the ring 11 about its center of rotation "M". However, if it is desired to tilt the ring 11 and adjust the position of the nozzle flaps 17, then the rod 15 performs an additional movement. This also applies when it is desired to adjust the position of the nozzle flap 17 alone that is without an adjustment of the position of the ring 11. Thus, the tilting adjustment and the adjustment of the cross sectional exit area of the nozzle 10 may be accomplished independently of each other.

Incidentally, by making the outer surface 12' of the nozzle body end member 12 of the nozzle body 20 in the form of a ring forming part of a sphere, or by making this portion cylindrical or conical, the respective center "$M_2$" will also be located on the central axis 23. This feature of the invention has the advantage that even in the fully tilted position of the ring 11 the latter does not reach into the thrust nozzle proper. Stated differently, the thrust nozzle 10 does not need to be provided with so-called constrictions to provide space for the individual structural components to enable their operability as is required in the prior art.

When the surface configuration 12' of the end member 12 of the nozzle body 20 constitutes a ring the surface of which forms part of a sphere or ball, the rotational center "$M_2$" of this surface configuration 12' is located according to the invention on the central axis 23 at a point of intersection between said axis 23 and a plane A—A which is defined by the ring 24 where the end member 12 and the nozzle body 20 meet as indicated in the drawing. According to the invention the center "$M_2$", which is fixed by said ring 24 defining the plane A—A, is axially displaced relative to the rotational center "M" of the ring 11 by a distance "D" which advantageously may be within the range of 0.05 to 0.20 of the diameter of the end member 12 of the nozzle body. The center $M_2$ is the center of curvature of the nozzle body end member 12.

The surface configuration 12' may, for example, be cylindrical between the sectional plane A—A and the sectional plane B—B. At the same time the portion between the sectional plane B—B and the sectional plane C—C may be spherical or conical. This feature has the advantage that even when the ring member 11 is fully tilted it will not reach into the opening of the nozzle body end member 12. Another advantage is seen in that the nozzle body end member 12 does not require to be provided with constrictions for accommodating structural components.

The above described features of the invention result in a very light and simple structure for the adjustment of the thrust vector angle, whereby a rapid and above all precise control is accomplished. This feature is especially advantageous for high speed aircraft requiring a high maneuverability. The invention accomplishes such a high maneuverability because the response times are short. In addition, the invention accomplishes an optimal weight reduction without reducing the overall performance of the system.

Another advantage of the features of the invention is seen in that there is no need for interfering with the original inner lining 22 of the thrust nozzle which, thus, may remain as originally delivered by the manufacturer of the propulsion system. Even if the ring 11 is fully tilted, the thrust nozzle itself is not affected or contacted by the tilting of the ring so that no structural modifications are required for equipping conventional thrust nozzles with the teaching of the invention. Another advantage of the invention is seen in that it avoids the numerous swivel joints required heretofore.

Although the invention has been described with reference to specific example embodiments, it will be appreciated, that it is intended, to cover all modifications and equivalence within the scope of the appended claims.

What is claimed is:

1. An apparatus for adjusting the direction of the thrust vector at the exit end of a thrust nozzle comprising a thrust nozzle body (20) having a longitudinal central axis (23), a nozzle body end member (12) operatively secured to said nozzle body (20) in a plane (A—A) extending radially relative to said central axis, said nozzle body end member (12) having an outer surface (12') of a given configuration, adjustable ring means (11), slide means (14) riding on said outer surface configuration (12') of said nozzle body end member (12), means securing said slide means to said adjustable ring means whereby the latter is slidable relative to said nozzle body end member, operating means (13) supported on said nozzle body (20) and operatively connected to said adjustable ring means (11), said nozzle body end member (12) having a center of curvature ($M_2$) located on said longitudinal central axis (23) where said plane (A—A) intersects said longitudinal axis (23), said adjustable ring means (11) being rotatable for adjustment about a rotational center (M) which is also located on said longitudinal central axis (23) and spaced downstream at a distance (D) from the center of curvature ($M_2$) of said nozzle body end member (12), said slide means (14) being arranged for taking up forces in directions extending substantially perpendicularly to said longitudinal central axis (23).

2. The apparatus of claim 1, wherein said outer surface configuration of said nozzle body end member has the shape of a ring cut out of a geometrical body.

3. The apparatus of claim 2, wherein said outer surface configuration of said nozzle body member has the shape of a ring cut out of a sphere.

4. The apparatus of claim 1, further comprising control means arranged in common for actuating said operating means of said adjustable ring means.

5. The apparatus of claim 1, wherein said nozzle body end member (12) has a given nozzle end diameter and wherein said centers (M, $M_2$) are spaced from each other along said longitudinal axis by a distance (D) within the range of 0.05 to 0.20 times said given nozzle end diameter.

* * * * *

UNITED STATES PATENT OFFICE
CERTIFICATE OF CORRECTION

Patent No. 4,219,156            Dated August 26, 1980

Inventor(s) Hans Schwaerzler

It is certified that error appears in the above-identified patent and that said Letters Patent are hereby corrected as shown below:

Claim 3, line 2, before "member" insert --end--.

*Signed and Sealed this*

*Eighteenth* Day of *November 1980*

[SEAL]

*Attest:*

SIDNEY A. DIAMOND

*Attesting Officer*      *Commissioner of Patents and Trademarks*